United States Patent
Denike et al.

(10) Patent No.: US 7,264,017 B2
(45) Date of Patent: Sep. 4, 2007

(54) DUAL-ACTUATOR AIRCRAFT ENVIRONMENTAL CONTROL SYSTEM VALVE

(75) Inventors: Stuart K. Denike, Phoenix, AZ (US); Don J. Atkins, Chandler, AZ (US); Robert D. Sleeper, Laveen, AZ (US); Mark W. Williams, Phoenix, AZ (US); Jay W. Lombardi, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 293 days.

(21) Appl. No.: 11/128,645

(22) Filed: May 12, 2005

(65) Prior Publication Data

US 2006/0255303 A1 Nov. 16, 2006

(51) Int. Cl.
*F16K 17/04* (2006.01)
*F16K 31/05* (2006.01)
*F16K 31/46* (2006.01)

(52) U.S. Cl. .................. 137/495; 251/14; 251/129.03; 454/72; 454/73; 454/74; 454/75

(58) Field of Classification Search .................. 251/14, 251/129.03; 137/495; 454/72, 73, 74, 75
See application file for complete search history.

(56) References Cited

U.S. PATENT DOCUMENTS

| 2,393,343 | A |   | 1/1946  | Schroeder           |         |
|-----------|---|---|---------|---------------------|---------|
| 2,585,814 | A |   | 2/1952  | McDonald            |         |
| 2,773,440 | A | * | 12/1956 | Arthur              | 454/72  |
| 3,253,611 | A | * | 5/1966  | Cummins             | 251/14  |
| 3,672,786 | A |   | 6/1972  | Mount               |         |
| 4,082,115 | A | * | 4/1978  | Gibb et al.         | 251/14  |
| 4,284,098 | A | * | 8/1981  | Kruschik            | 251/14  |
| 4,477,051 | A |   | 10/1984 | Ben-Yehuda          |         |
| 4,679,764 | A | * | 7/1987  | Smith et al.        | 251/14  |
| 4,903,936 | A |   | 2/1990  | Kajiwara            |         |
| 4,960,249 | A |   | 10/1990 | Signoret et al.     |         |
| 5,046,686 | A |   | 9/1991  | Carla et al.        |         |
| 5,105,729 | A |   | 4/1992  | Signoret et al.     |         |
| 5,881,768 | A |   | 3/1999  | Bezos et al.        |         |
| 6,651,687 | B2|   | 11/2003 | Taylor              |         |

FOREIGN PATENT DOCUMENTS

EP    06113594    8/2006
GB     8170216 A  7/1959

\* cited by examiner

*Primary Examiner*—Stephen M. Hepperle
(74) *Attorney, Agent, or Firm*—Ingrassia Fisher & Lorenz

(57) ABSTRACT

A regulator valve includes dual actuators that operate according to different principles to position a valve element to either an open or a closed position. One actuator, which is an electromechanical actuator, operates in response to electrical command signals. The other actuator, which is a pneumatic actuator, operates in response to a fluid pressure. The electromechanical actuator is responsive to the electrical command signals to rotate in either a valve open or a valve close direction, to move the valve element to either the open or closed position.

20 Claims, 6 Drawing Sheets

DUAL-ACTUATOR AIRCRAFT ENVIRONMENTAL CONTROL SYSTEM VALVE

TECHNICAL FIELD

The present invention relates to aircraft environmental control systems and, more particularly, to an aircraft environmental control system that includes a dual-actuator valve.

BACKGROUND

Many aircraft include an environmental control system to supply and distribute conditioned air to one or more cabins within the aircraft. In some aircraft, the environmental control system includes an inlet duct that receives air conditioned air from an air source and two or more distribution ducts that supply the conditioned air to the aircraft cabins. A regulator valve that is moveable between an open position and a closed position may be mounted on one of the distribution ducts and used to regulate flow through the system. In such instances, when the regulating valve is in the closed position, conditioned air is supplied to the aircraft cabins via only one of the outlet ducts. Conversely, when the valve is in the open position, conditioned air is supplied to the aircraft cabins via all of the distribution ducts. The position of the regulator valve may be controlled by a valve actuator that receives valve position commands from an external controller and, in response to the received commands, moves the regulator valve to the commanded position.

In order to minimize aircraft weight, the air distribution ducts in the above-described environmental control system may be constructed with thin walls, and of relatively lightweight materials such as, for example, a wrapped composite. It will thus be appreciated that in certain rare instances if the system were to experience a sudden increase in flow rate when the regulating valve is in the closed position, pressure on one side of the regulating valve suddenly increase. If this pressure is not relieved, it may exceed an acceptable level and adversely impact the structural integrity of the distribution ducts. Preferably, if such an event were to occur, the regulating valve would be commanded to the open position to allow air to flow through all of the distribution ducts. However, in the highly unlikely event the control system did not command the regulating valve to open, or the regulating valve did not open for some other reason, the pressure in the distribution ducts upstream of the regulating valve may increase to an unacceptable level.

To address the above-noted overpressure concern, a parallel duct system has been implemented into some aircraft. The parallel duct system includes a separate duct coupled to one of the existing distribution ducts in the environmental control system, and a relief valve mounted on the duct. When the pressure increases to an unacceptable level, the relief valve opens and directs air either overboard or to other sections of the aircraft. However, this system, too, may have disadvantages. Specifically, the parallel duct system includes additional components which may increase the weight and/or manufacturing cost of the aircraft.

Accordingly, there is a need for an environmental control system that maintains the structural integrity of the distribution ducts in the unlikely event of an unexpected airflow rate increase. In addition, there is a need for an environmental control system that is lightweight and relatively inexpensive to implement. The present invention addresses one or more of these needs.

BRIEF SUMMARY

The present invention provides a dual-actuator valve for an environmental control system that functions to maintain the structural integrity of the system distribution ducts in the unlikely event of an unexpected airflow rate increase.

In one embodiment, and by way of example only, an aircraft environmental control system valve includes a valve body, a motor, a valve element, and a pneumatic actuator. The valve body defines a flow passage. The motor is adapted to receive valve position command signals representative of a commanded valve position and is configured, in response to the valve position command signals, to rotate in a commanded direction. The valve element is disposed at least partially within the flow passage and is moveable between an open position and a closed position. The valve element is at least partially responsive to motor rotation to move to the commanded valve position. The pneumatic actuator is coupled to the valve body and is adapted to sense fluid pressure in the flow passage upstream of the valve element. The pneumatic actuator is configured to supply an open drive force that moves the valve element to the open position when the sensed fluid pressure reaches a predetermined value regardless of the commanded valve position.

In another exemplary embodiment, an aircraft environmental control system valve includes a valve body, a motor, a backlash coupling, a valve element, a pneumatic actuator, and a bellcrank. The valve body defines a flow passage. The motor is adapted to receive valve position command signals representative of a commanded valve position and is configured, in response to the valve position command signals, to rotate in a commanded direction. The backlash coupling is coupled to the motor and is configured to rotate in response thereto. The valve element is disposed at least partially within the flow passage and is moveable between an open position and a closed position. The valve element is at least partially responsive to backlash coupling rotation to move to the commanded valve position. The pneumatic actuator is coupled to the valve body and is adapted to sense fluid pressure in the flow passage upstream of the valve element. The pneumatic actuator is configured to supply an open drive force when the sensed fluid pressure reaches a predetermined value. The bellcrank is coupled between the pneumatic actuator and the valve element and is configured to move the valve element to the commanded position at least partially in response to rotation of the backlash coupling, and move the valve element to the open position in response to the open drive force regardless of the commanded valve position.

In yet another exemplary embodiment, an aircraft environmental control system includes an air supply duct, a first distribution duct, a second distribution duct, and a regulator valve. The air supply duct is adapted to receive a flow of conditioned air from a conditioned air source. The first distribution duct is coupled to the air supply duct to receive the flow of conditioned air therefrom. The second distribution duct is coupled to the air supply duct. The regulator valve is mounted on the second distribution duct and is moveable between an open position, in which the flow of conditioned air flows into and through the second distribution duct, and a closed position, in which the flow of conditioned air does not flow into and through the second distribution duct. The regulator valve includes a valve body, a motor, a valve element, and a pneumatic actuator. The valve body defines a flow passage. The motor is adapted to receive valve position command signals representative of a commanded valve position and is configured, in response to the valve position command signals, to rotate in a commanded direction. The valve element is disposed at least partially within the flow passage and is moveable between an open position and a closed position. The valve element is at least partially responsive to motor rotation to move to the commanded valve position. The pneumatic actuator is coupled to the valve body and is adapted to sense fluid pressure in the flow passage upstream of the valve element. The pneumatic actuator is configured to supply an open drive force that moves the valve element to the open position when the sensed fluid pressure reaches a predetermined value regardless of the commanded valve position.

Other independent features and advantages of the preferred environmental control system and valve will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. In this regard, although the invention is described herein as being implemented in an aircraft environmental control system, it will be appreciated that it could also be implemented in any one of numerous other types of systems that direct the flow of various types of fluid, and any one of numerous other types of systems both within or apart from an aircraft.

Figure 1:
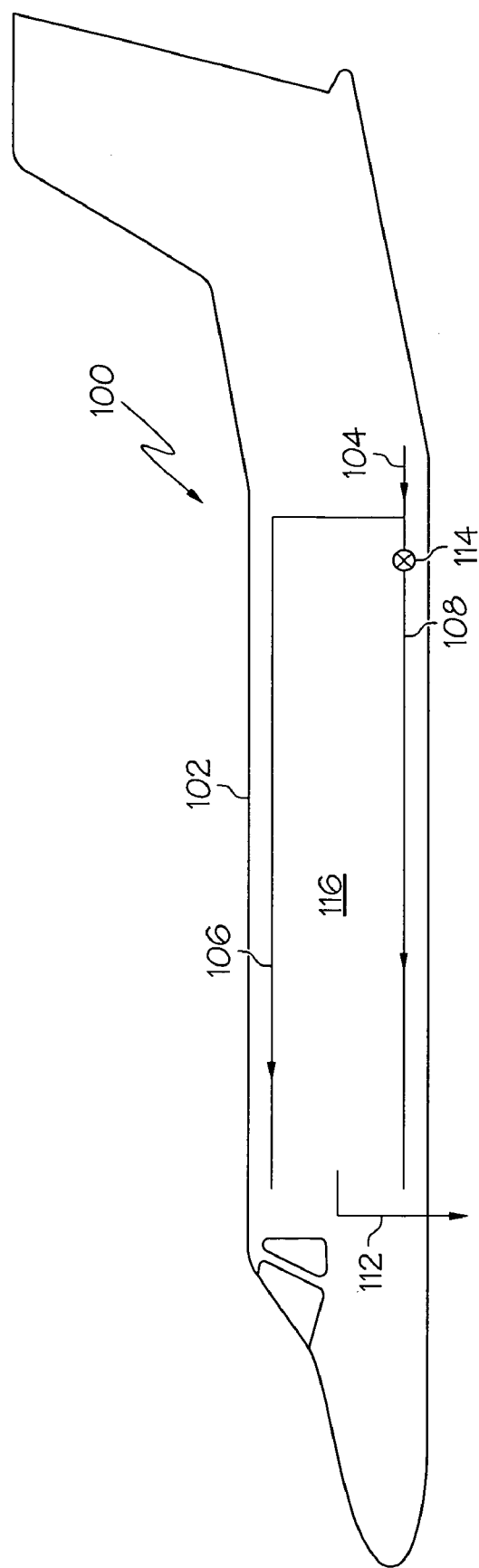
FIG. 1 is a simplified schematic diagram of a portion of an exemplary aircraft environmental control system.

FIG. 1 is a simplified schematic diagram depicting a portion of an exemplary aircraft environmental control system 100. The depicted portion of the environmental control system 100 is disposed within an aircraft fuselage 102, and includes an air supply duct 104, first and second distribution ducts 106 and 108, an air evacuation duct 112, and a regulating valve 114. The air supply duct 104 receives air from a conditioned air source, such as, for example, an air cooling system that is supplied with engine bleed air (neither of which are illustrated). The air in the air supply ducts 104 is distributed to an aircraft cabin 116 via the distribution ducts 106, 108, and is exhausted from the aircraft cabin 116 via the air evacuation duct 112.

Although the system 100 may be configured to distribute air in any one of numerous ways, in the depicted embodiment the system 100 is configured such that the first distribution duct 106 distributes air into the aircraft cabin 116 via, for example, one or more gasper valves (not shown), and the second distribution duct 108 distributes air into the cabin 116 via, for example, underfloor vents (not shown). It will be appreciated that although two distribution ducts 106, 108 are shown, the system could be implemented with fewer or more distribution ducts.

The regulator valve 114 is mounted on the second air distribution duct 108 and is configured to control air flow between the first and second distribution ducts 106, 108. In this regard, the regulator valve 114 is moveable between an open position, in which air flows into the aircraft cabin 116 via both distribution ducts 106, 108, and a closed position, in which air flows into the aircraft cabin 116 via only the first distribution duct 106. The regulator valve 114 is also configured to relieve pressure in the air supply duct 104 if the pressure in the air supply duct 104 reaches a predetermined relief pressure. More specifically, if the pressure in the air supply duct 104 reaches the predetermined relief pressure, the regulator valve 114 opens and relieves the pressure in the air supply duct 104 to the aircraft cabin 116, via the second distribution duct 108. An exemplary embodiment of the regulator valve is depicted in FIG. 2 and with reference thereto will now be described in more detail.

Figure 2:
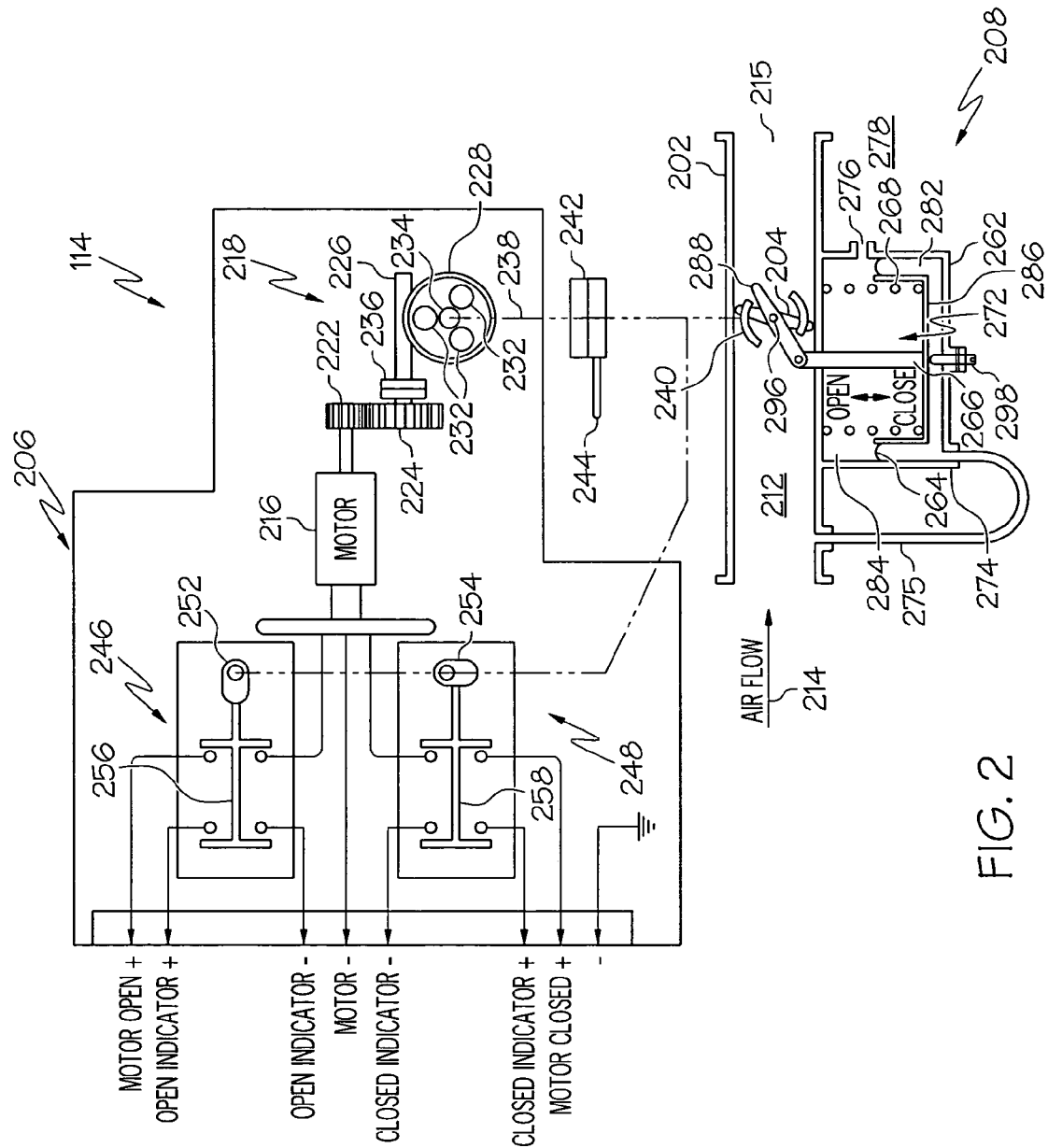
FIG. 2 is a schematic representation of a regulating valve 114 that may be implemented in the exemplary environmental control system of FIG. 1.

The regulator valve 114, which is depicted schematically in FIG. 2, includes a valve body 202, a valve element 204, an electromechanical actuator 206, and a pneumatic actuator 208. The valve body 202 defines a flow passage 212 having an inlet port 214, and an outlet port 215. The valve element 204 is disposed within the flow passage 212 and is moveable between an open position, in which the inlet port 214 and outlet port 215 are in fluid communication with one another, and a closed position, in which the inlet port 214 and outlet port 215 are in not fluid communication with one another. In the depicted embodiment, the valve element 204 is implemented as a butterfly plate. It will be appreciated, however, that this is merely exemplary and that the valve element 204 could be implemented as any one of numerous other types of elements such as, for example, a gate or a globe.

The electromechanical actuator 206 is coupled to receive valve position command signals and, in response to the command signals, rotates in either a valve open or a valve close direction. More specifically, the electromechanical actuator 206 is adapted to receive valve position command signals that are representative of a commanded valve position from, for example, a non-illustrated controller. The electromechanical actuator 206, in response to the valve position command signals, rotates in either the valve open or valve close direction to either move the valve element 204, or allow the valve element 204 to be moved, to the commanded valve position.

It will be appreciated that the electromechanical actuator 206 may be implemented in any one of numerous configurations, but in the depicted embodiment the electromechanical actuator 206 includes a motor 216 and a gear train 218. The motor 216 is adapted to receive the valve position command signals and is configured, in response to the valve position command signals, to rotate in either a valve open direction or a valve close direction. It will be appreciated that the motor 216 may be implemented as any one of numerous types of AC or DC motors, but in the depicted embodiment the motor 216 is implemented as a brushed DC motor.

The gear train 218 is coupled to and rotates with the motor 216. The gear train 218, at least in the depicted embodiment, is implemented as a step-down gear train that includes a pinion gear 222, a spur gear 224, a worm gear 226, a worm wheel 228, a plurality of planetary gears 232, and a sun gear 234. The pinion gear 222 is coupled to, and rotates with, the motor 216. The spur gear 224 meshes with the pinion gear 222, and is sized to provide one stage of speed reduction. The worm gear 226 is coupled to the spur gear 224, preferably via a torque-limiting slip clutch 236, and meshes with the worm wheel 228 to provide another stage of speed reduction. The planetary gears 232 mesh with the worm wheel 228 and the sun gear 234, and provide yet an additional stage of speed reduction. The sun gear 234 is turn coupled to a drive shaft 238. Thus, the gear train 218 rotates the drive shaft 238 at a rotational speed that is less than the rotational speed of the motor 216. It will be appreciated that the gear train 218 depicted and described herein is merely exemplary, and that the electromechanical actuator 206 could be implemented with any one of numerous gear train configurations. Moreover, in some embodiments, the electromechanical actuator 206 could be implemented without the gear train 218 altogether.

Before proceeding further, it is noted that the drive shaft 238 is coupled to a backlash coupling 240. Thus, when the electromechanical actuator 206 rotates the drive shaft 238, the backlash coupling 240 also rotates. As will be described in more detail further below, the backlash coupling 240 is configured such that it allows the electromechanical actuator 206 to move the valve element 204 to the open position, but not to the closed position. Instead, a spring force supplied from the pneumatic actuator 208 moves the valve element 204 to the closed position when the electromechanical actuator 206 rotates in the close direction.

The regulator valve 114 also preferably includes a manual override clutch 242 and manual override lever 244. The manual override clutch 242 and manual override lever 244 are preferably mounted on the drive shaft 238 between the gear train 218 and the backlash coupler 240, and are configured to allow manual manipulation of the valve element 204, if so desired. It will be appreciated that the manual override clutch 242 and manual override lever 244 may be implemented in any one of numerous configurations. But in the depicted embodiment, these devices are implemented such that when the manual override lever 244 is rotated, it causes the manual override clutch 242 to disengage the shaft 238 from the gear train 218, and allows manual movement of the valve element 204, via the manual override lever 244, to the desired position.

The manual override lever 244 also provides a local visual indicator of the position of the valve element 204. In addition, as FIG. 2 further shows, the regulator valve 114 is preferably equipped with a pair of valve position actuator switch assemblies—an open actuator switch assembly 246, and a closed actuator switch assembly 248. The open and close actuator switch assemblies 246 and 248 provide valve open and valve close signals, respectively, and enable electrical valve opening and valve closing operations, respectively. Although the valve position actuator switch assemblies 246, 248 could be implemented in any one of numerous configurations, in the depicted embodiment each assembly 246, 248 includes a switch actuator cam 252, 254 and a switch 256, 258.

The switch actuator cams 252, 254 are each coupled to, and rotated by, the shaft 238, and are each further coupled to one of the switches 256, 258. In FIG. 2, the regulator valve 114 is shown with the valve element 204 in the closed position. As such, the open switch actuator cam 252 is positioned such that the open switch 256 disables the open indicator circuit, yet enables the motor 216, upon receipt of an open valve position command signal, to be driven in the open direction. Conversely, the closed switch actuator cam 254 is positioned such that the closed switch 258 enables the closed indicator circuit, yet disables the motor 216 from being further driven in the closed direction.

Turning now to a description of the pneumatic actuator 208, it is seen that this device includes a housing 262, a diaphragm 264, an actuator shaft 266, and a bias spring 268. The housing 262 is coupled to the valve body 202 and includes an inner volume 272, and two ports—a pressure sensing port 274 and a reference pressure port 276. In the depicted embodiment, the pressure sensing port 274 is in fluid communication with the flow passage 212 upstream of the valve element 204 via, for example, a conduit 275, and the reference pressure port 276 is in fluid communication with the ambient environment 278 surrounding the housing 262.

The diaphragm 264 is disposed within the housing inner volume 272 and divides the inner volume 272 into a first control volume 282 and a second control volume 284. The first control volume 282 is in fluid communication with the pressure sensing port 274, and the second control volume is in fluid communication with the reference pressure port 276. Thus, the pressure in the first control volume 282 is substantially equal to the pressure in the flow passage 212 upstream of the valve element 204, and the pressure in the second control volume 284 is substantially equal to the ambient environment 278. It will be appreciated that the diaphragm 264 may be disposed within the housing 262 in any one of numerous configurations, but in the depicted embodiment, the diaphragm 264 is supported by the housing 262, and is coupled to, or formed integrally with, a substantially rigid diaphragm plate 286. The diaphragm plate 286 is in turn coupled to the actuator shaft 266

The actuator shaft 266 is coupled to the diaphragm plate 286 and to a bellcrank 288 and, as illustrated, is configured to translate in an open direction and a close direction. The bellcrank 288 is coupled to the valve element 204 via, for example, a rotationally mounted valve shaft 296, and, in response to actuator shaft 266 translation in the open and close directions, rotates the valve element 204 to the open and closed positions, respectively. As will be described in more detail further below, the configuration of the bellcrank 288 and the backlash coupling 240 allows the pneumatic actuator 208 to move the valve element 204 to the open position, regardless of the valve position command being supplied to the electromechanical actuator 206.

The bias spring 268 is disposed within the housing 262, and is configured to supply a force that biases the actuator shaft 266 toward the close direction and thus, as depicted in FIG. 2, biases the bellcrank 288 against the backlash coupling 240. It is additionally seen that if the pressure in the flow passage 212 upstream of the valve element 204 increases to the predetermined relief pressure, the pressure in the first control volume 282 will supply a force to the diaphragm plate 286 that exceeds the bias force supplied thereto from the bias spring 268. As a result, the actuator shaft 266 will move in the open direction, supplying an open drive force to the bellcrank 288 and the valve shaft 296 to thereby move the valve element 204 to the open position. As was alluded to above, this open drive force supplied by the pneumatic actuator 208 moves the valve element 204 to the open position regardless of the valve position command being supplied to the electromechanical actuator 206. Although the bias spring 268 could be implemented as any one of numerous types of springs and in any one of numerous configurations, in the depicted embodiment the bias spring 268 is a coil spring disposed within the housing second control volume 284, and is configured to engage the housing 262 and the diaphragm plate 286.

The pneumatic actuator 208 also preferably includes a close stop 298. The close stop 298 extends through the housing 262 and is used to adjust the maximum distance the actuator shaft 266 can move in the close direction. Although the close stop 298 could be implemented in any one of numerous configurations, it is preferably implemented with threads that mate with like threads on the housing 262 to provide some adjustability.

Figure 3:
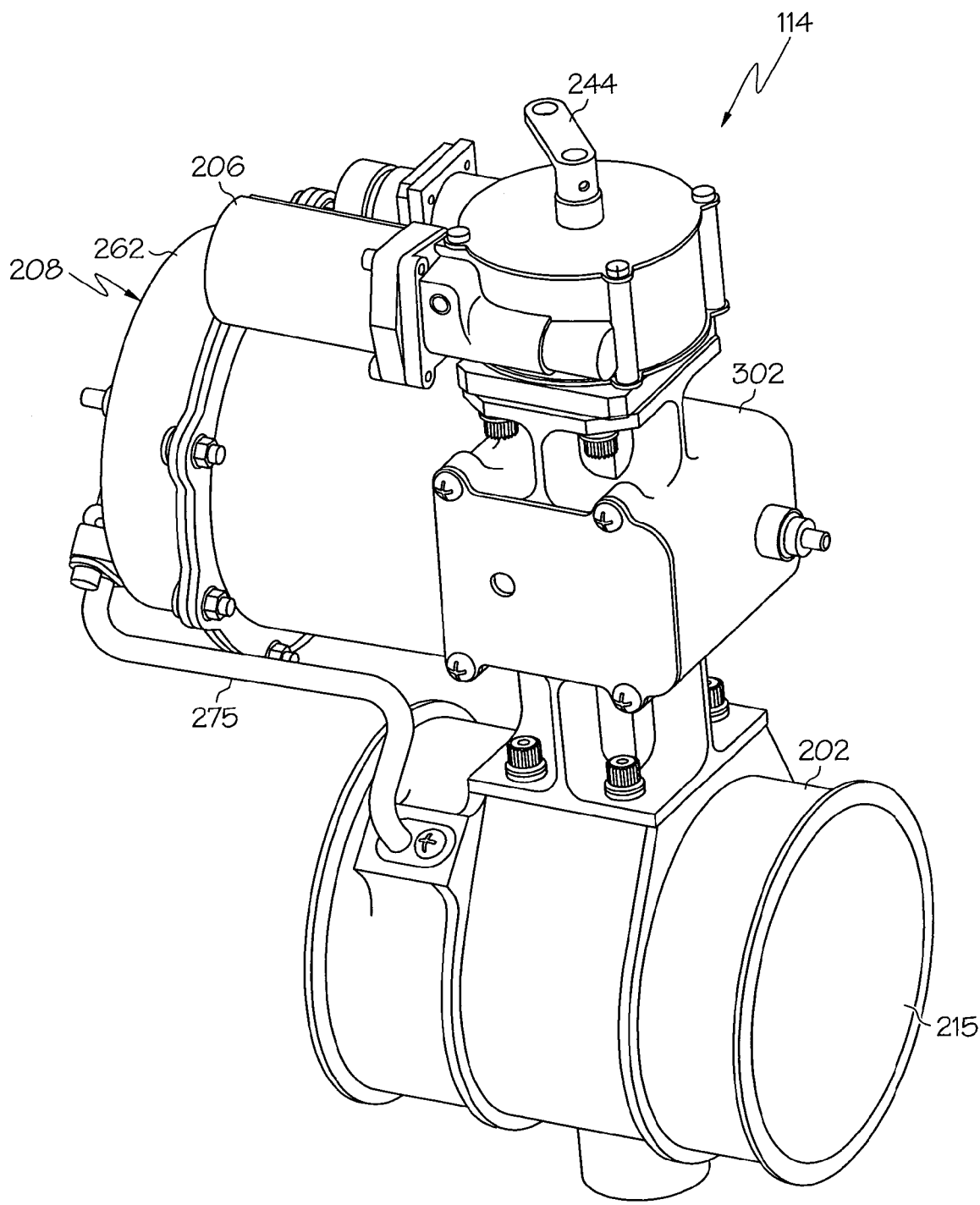
FIGS. 3 and 4 are perspective views of an exemplary physical implementation of the regulating valve illustrated in FIG. 2.
Figure 4:
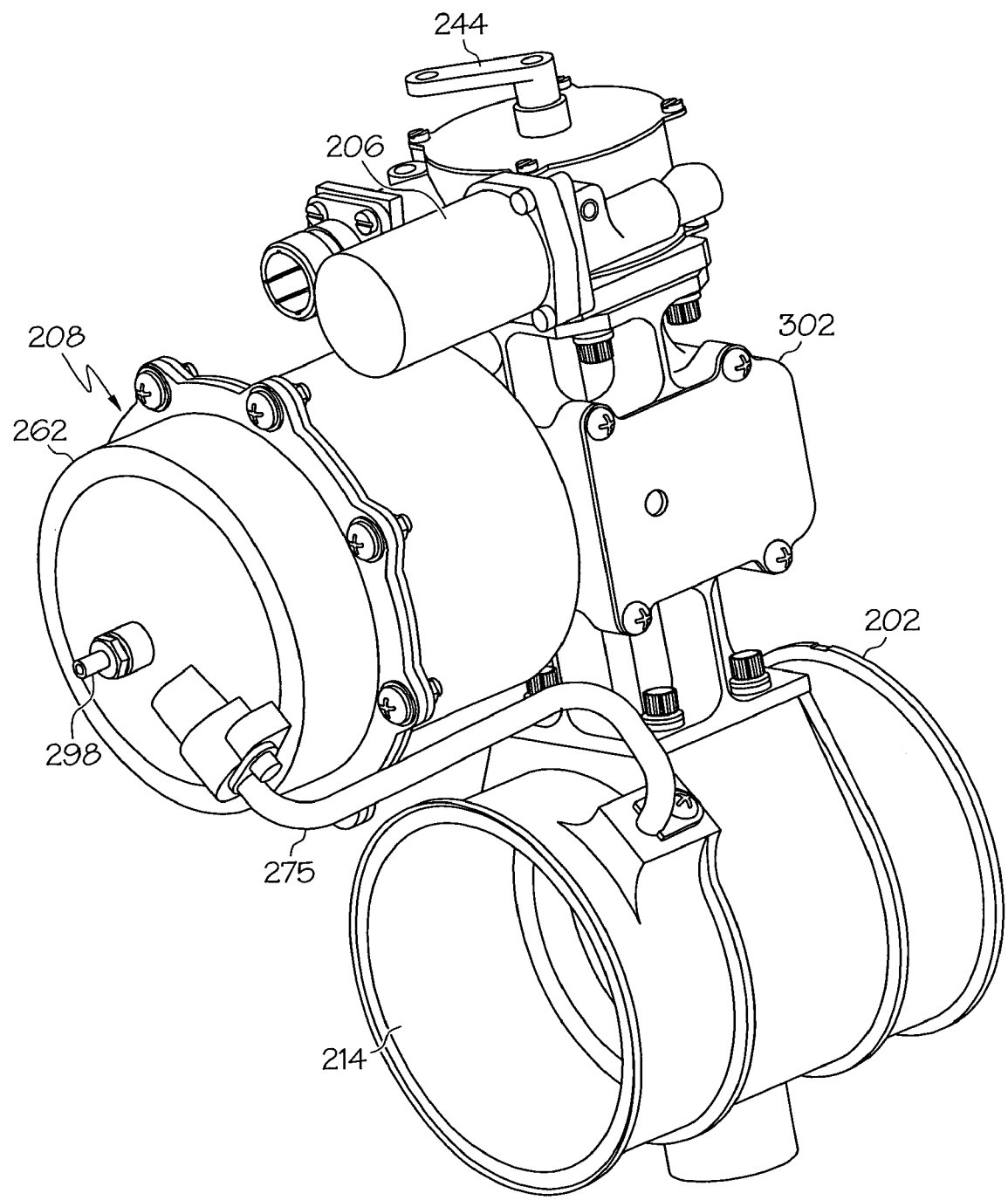
Figure 5:
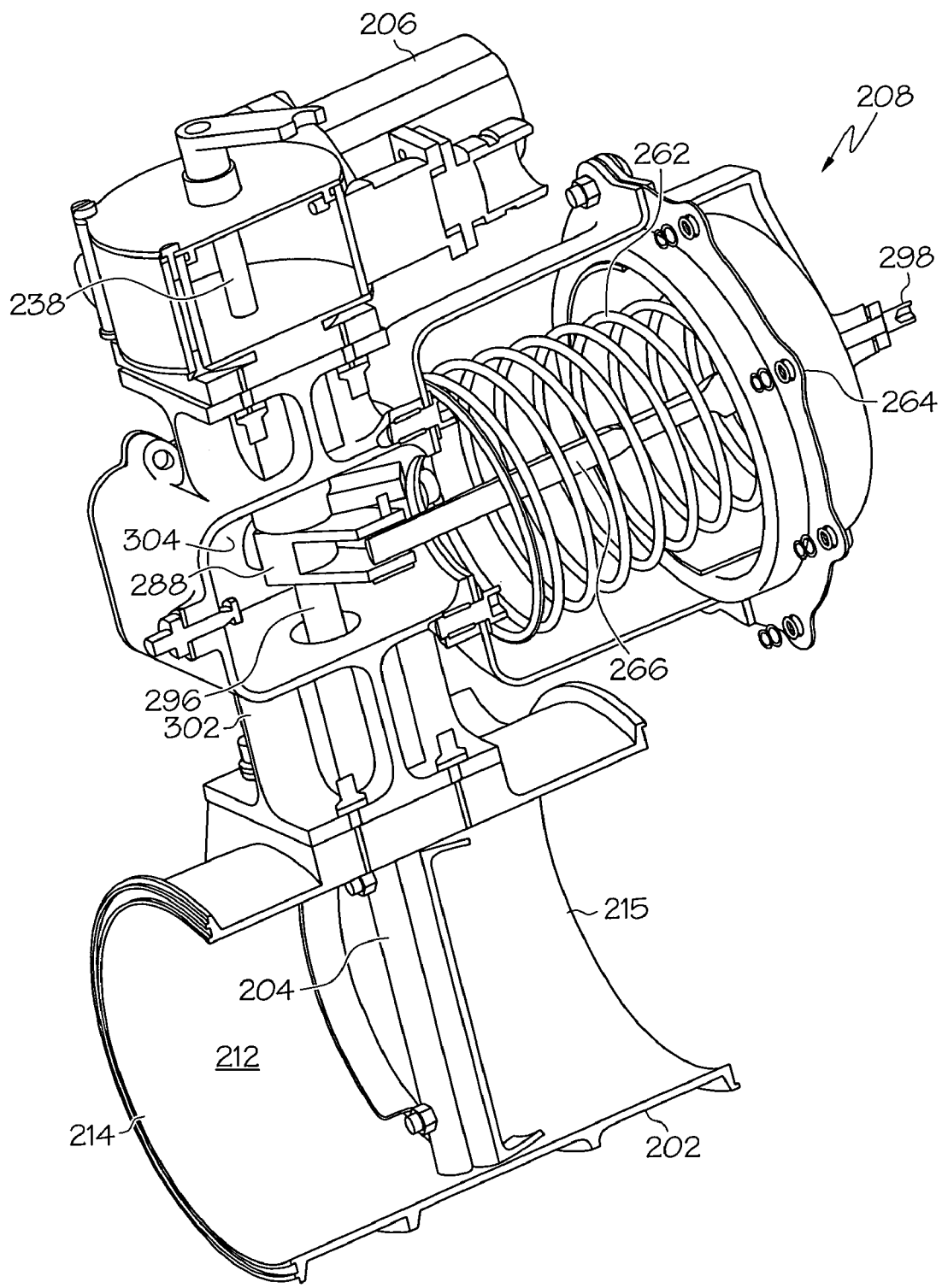
FIG. 5 is a partial cut-away perspective view of the regulating valve illustrated in FIGS. 3 and 4.

The regulator valve 114 depicted in FIG. 2 and described above may be physically implemented in any one of numerous configurations. One particular physical implementation is illustrated in FIGS. 3-5, in which like reference numerals refer to like parts of the regulator valve 114 that is depicted schematically in FIG. 2. In the physical implementation shown in FIGS. 3-5 the valve body 202, electromechanical actuator 206, and pneumatic actuator 208 are each mounted to a mount housing 302. As shown most clearly in FIG. 5, the drive shaft 238 and valve shaft 296 extend through the mount housing 302 and are coupled to the backlash coupling 240 and the bellcrank 288, respectively, which are in turn disposed within a cavity 304 formed in the mount housing 302. The actuator shaft 266 also extends info the cavity 304 and is coupled therein to the bellcrank 288.

During system operation, the regulator valve 114 is operated either electrically, via the electromechanical actuator 206, or pneumatically, via the pneumatic actuator 208. In addition, as was previously noted, the regulator valve 114 can, if so desired, be operated manually. In most instances, the regulator valve 114 is operated electrically via the electromechanical actuator 206 responding to valve position command signals supplied from, for example, a non-illustrated control circuit. The regulator valve 114 is operated pneumatically via the pneumatic actuator 208 if pressure upstream of the valve element 204 reaches the predetermined relief pressure. Electrical and pneumatic operation of the regulator valve 114 will now be each described, beginning first with electrical operation. In doing so, reference should be made to FIGS. 2 and 6 in combination. Moreover, the description of the electrical operation assumes that the valve element 204 is initially in the closed position, and that pressure in the flow passage 212 upstream of the valve element 204 is below the predetermined relief pressure.

Figure 6:
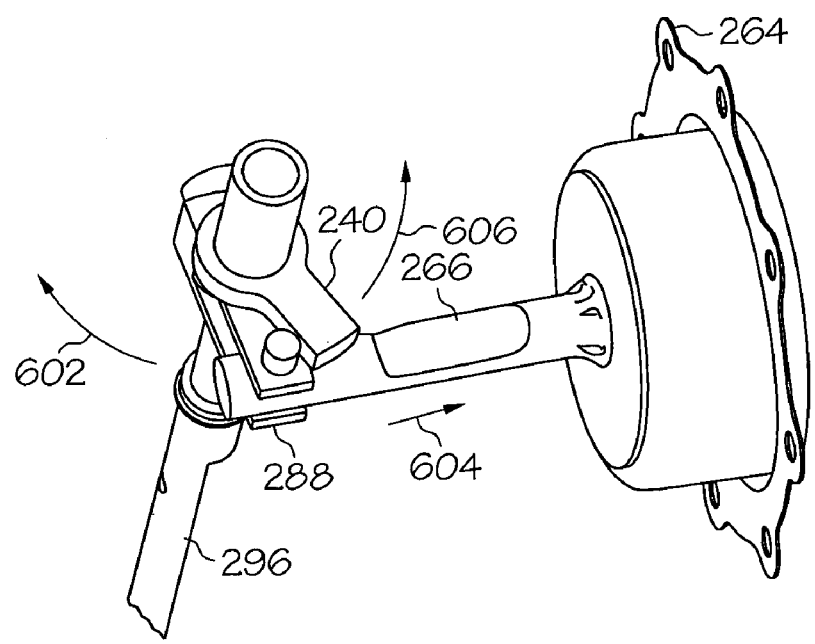
FIG. 6 is a perspective view of select components used to implement the valve shown in FIGS. 3-5, illustrating electrical operation of the regulating valve.

When a valve open command signal is supplied to the electromechanical actuator 206, the electromechanical actuator 206 will rotate in the valve open direction. The electromechanical actuator 206 in turn rotates the drive shaft 238 and backlash coupling 240 in the open direction, as illustrated in FIG. 6 by arrow 602. Because pressure in the fluid passage 212 upstream of the valve element 204 is below the predetermined relief pressure, the bias spring 268 biases the bellcrank 288 against the backlash coupling 240, as indicated by arrow 604 in FIG. 6. As a result, the bellcrank 288 and valve shaft 296 are rotated in the open direction. Rotation of the bellcrank 288 and valve shaft 296 in the open direction in turn causes the valve element 204 to move toward the open position. When the valve element 204 reaches the open position, the open actuator switch assembly 246 electrically closes the open indicator circuit and electrically opens the circuit supplying power to the motor 216.

When a valve close command signal is supplied to the electromechanical actuator 206, the electromechanical actuator 206 will rotate in the valve close direction. The electromechanical actuator 206 in turn rotates the drive shaft 238 and backlash coupling 240 in the close direction, as illustrated in FIG. 6 by arrow 606. Because pressure in the fluid passage 212 upstream of the valve element 204 is below the predetermined relief pressure, the bias spring 268 continues to bias the bellcrank 288 against the backlash coupling 240. As a result, when the backlash coupling 240 rotates in the close direction, the bellcrank 288 and valve shaft 296 also rotate in the close direction. Rotation of the bellcrank 288 and valve shaft 296 in the close direction in turn causes the valve element 204 to move toward the closed position. When the valve element 204 reaches the closed position, the closed actuator switch assembly 248 electrically closes the closed indicator circuit and electrically opens the circuit supplying power to the motor 216.

As was noted above, pneumatic operation of the regulator valve 114 is implemented if pressure upstream of the valve element 204 reaches the predetermined relief pressure. As was also previously noted, when the predetermined relief pressure is reached, the pneumatic actuator 208 supplies an open drive force that moves the valve element 204 to the open position, regardless of the commanded valve position. Thus, in the following description, it is assumed that the regulator valve 114 is initially in the closed position when pressure upstream of the valve element 204 reaches the predetermined relief value.

Figure 7:
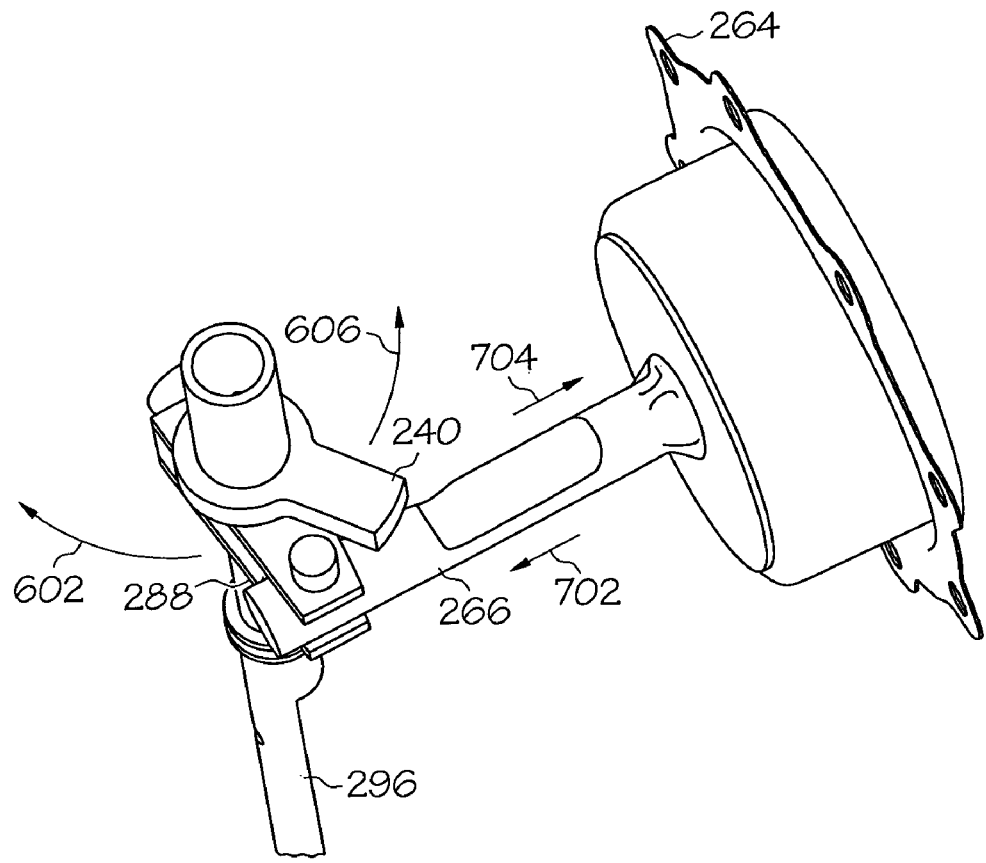
FIG. 7 is a perspective view of select components used to implement the valve shown in FIGS. 3-5, illustrating pneumatic operation of the regulating valve.

Turning now to FIGS. 2 and 7 in combination, as pressure in the flow passage 212 upstream of the valve element 204 begins increasing, the pressure in the first control volume 282, which applies a force to the diaphragm 264 opposing the spring bias force, also begins increasing. When this pressure reaches the predetermined relief pressure, the pressure force acting on the diaphragm 264 overcomes the spring bias force and moves the actuator shaft 266 in the open direction, as shown in FIG. 7 using arrow 602. As a result, the bellcrank 288 and valve shaft 296 rotate in the open direction, which in turn causes the valve element 204 to move to the open position. As shown most clearly in FIG. 7, when the bellcrank 288 rotates in the open direction 704 it disengages from the backlash coupling 240. Thus, even if a valve close command is supplied to the electromechanical actuator 206, the pneumatic actuator 208 will move the valve element 204 to the open direction, and keep the valve element in the open position until pressure in the flow passage 212 is reduced to a predetermined reset pressure value.

When the pressure in the flow passage 212 is reduced to the predetermined reset pressure value, the force supplied to the diaphragm 264 from the bias spring 268 will exceed the pressure force acting on the diaphragm. As a result, the bias spring 268 will supply a bias force to the actuator shaft 266 that will urge the actuator shaft 266 toward the close direction, as shown in FIG. 7 using arrow 704. So long as the electromechanical actuator 206 is being commanded to the open position, the actuator shaft 266 will move toward the close direction in response to the bias force. This in turn causes the bellcrank 288, the valve shaft 296, and thus the valve element 204 to rotate in the close direction 606.

The regulator valve described herein includes dual actuators that operate according to different principles to position a valve element to either an open or a closed position. One of the actuators implements a pressure relief function that will move the valve to the open position, to thereby relieve fluid pressure, regardless of whether the other actuator is being commanded to move the valve to the closed position. The regulator valve is configured similar to current valves used in many environmental control systems, and may thus be readily installed into existing systems. Moreover, because the regulator valve implements the pressure relief function, it system distribution ducts can be constructed of lighter weight, lower strength materials, and the parallel duct system can be eliminated, all of which can reduce overall system weight and/or costs.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An aircraft environmental control system valve, comprising:
   a valve body defining a flow passage;
   a motor adapted to receive valve position command signals representative of a commanded valve position, the motor configured, in response to the valve position command signals, to rotate in a commanded direction;
   a valve element disposed at least partially within the flow passage and moveable between an open position and a closed position, the valve element at least partially responsive to motor rotation to move to the commanded valve position; and
   a pneumatic actuator coupled to the valve body and adapted to sense fluid pressure in the flow passage upstream of the valve element, the pneumatic actuator configured to supply an open drive force that moves the valve element to the open position solely when the sensed fluid pressure reaches a predetermined value, regardless of the commanded valve position.

2. The valve of claim 1, wherein:
   the pneumatic actuator is further configured to supply a close drive force that urges the valve element toward the closed position at least when (i) the valve element is not in the closed position and (ii) the sensed fluid pressure is below the predetermined value; and
   the close drive force has a magnitude that is insufficient to move the valve element to the closed position when the commanded valve position is the open position.

3. The valve of claim 2, wherein the pneumatic actuator is configured to supply the close drive force when the valve element is in the closed position.

4. The valve of claim 1, wherein the pneumatic actuator comprises:
   a housing having an inner volume;
   a diaphragm disposed within the housing that divides the inner volume into a first control volume and a second control volume, the first control volume in fluid communication with the flow passage upstream of the valve element, the second control volume in fluid communication with a reference pressure;
   an actuator shaft coupled between the diaphragm and the valve element; and
   a spring disposed within the second volume and coupled between the housing and the diaphragm, the spring configured to supply a spring force to the diaphragm.

5. The valve of claim 4, wherein:
   the spring supplies a close drive force that urges the valve element toward the closed position at least when (i) the valve element is not in the closed position and (ii) the sensed fluid pressure is below the predetermined value; and
   the close drive force has a magnitude that is insufficient to move the valve element to the closed position when the commanded valve position is the open position.

6. The valve of claim 1, further comprising:
   a backlash coupling coupled to the motor and configured to rotate in response thereto; and
   a bellcrank coupled between the pneumatic actuator and the valve element and configured to (i) move the valve element to the commanded position at least partially in response to rotation of the backlash coupling and (ii) move the valve element to the open position in response to the open drive force, regardless of the commanded valve position.

7. The valve of claim 6, wherein the bellcrank is configured to:
   engage the backlash coupling at least when (i) the sensed fluid pressure is below the predetermined value and (ii) the commanded valve position is the open position; and
   disengage the backlash coupling at least when (i) the sensed fluid pressure is at or above the predetermined value and (ii) the commanded valve position is not the open position.

8. The valve of claim 6, further comprising:
   a drive shaft coupled between the motor and the backlash coupling; and
   a valve shaft coupled between the bellcrank and the valve element.

9. The valve of claim 1, further comprising:
   a gear train coupled between the motor and the valve element, the gear train configured to couple the motor rotation to the valve element.

10. An aircraft environmental control system valve, comprising:
    a valve body defining a flow passage;
    a motor adapted to receive valve position command signals representative of a commanded valve position, the motor configured, in response to the valve position command signals, to rotate in a commanded direction;
    a backlash coupling coupled to the motor and configured to rotate in response thereto;
    a valve element disposed at least partially within the flow passage and moveable between an open position and a closed position, the valve element at least partially responsive to backlash coupling rotation to move to the commanded valve position;
    a pneumatic actuator coupled to the valve body and adapted to sense fluid pressure in the flow passage upstream of the valve element, the pneumatic actuator configured to supply an open drive force when the sensed fluid pressure reaches a predetermined value; and
    a bellcrank coupled between the pneumatic actuator and the valve element and configured to (i) move the valve element to the commanded position at least partially in response to rotation of the backlash coupling and (ii) move the valve element to the open position in response to the open drive force regardless of the command valve position.

11. The valve of claim 10, wherein:
the pneumatic actuator is further configured to supply a close drive force to the bellcrank that urges the valve element toward the closed position at least when (i) the valve element is not in the closed position and (ii) the sensed fluid pressure is below the predetermined value; and
the close drive force has a magnitude that is insufficient to move the valve element to the closed position when the commanded valve position is the open position.

12. The valve of claim 11, wherein the pneumatic actuator is configured to supply the close drive force when the valve element is in the closed position.

13. The valve of claim 10, wherein the pneumatic actuator comprises:
a housing having an inner volume;
a diaphragm disposed within the housing that divides the inner volume into a first control volume and a second control volume, the first control volume in fluid communication with the flow passage upstream of the valve element, the second control volume in fluid communication with a reference pressure;
an actuator shaft coupled between the diaphragm and the bellcrank; and
a spring disposed within the second volume and coupled between the housing and the diaphragm, the spring configured to supply a spring force to the diaphragm.

14. The valve of claim 13, wherein:
the spring supplies a close drive force to the bellcrank that urges the valve element toward the closed position at least when (i) the valve element is not in the closed position and (ii) the sensed fluid pressure is below the predetermined value; and
the close drive force has a magnitude that is insufficient to move the valve element to the closed position when the commanded valve position is the open position.

15. The valve of claim 10, further comprising:
a drive shaft coupled between the motor and the backlash coupling; and
a valve shaft coupled between the bellcrank and the valve element.

16. The valve of claim 10, further comprising:
a gear train coupled between the motor and the valve element, the gear train configured to couple the motor rotation to the backlash coupling.

17. The valve of claim 10, wherein the bellcrank is configured to:
engage the backlash coupling at least when (i) the sensed fluid pressure is below the predetermined value and (ii) the commanded valve position is the open position; and
disengage the backlash coupling at least when (i) the sensed fluid pressure is at or above the predetermined value and (ii) the commanded valve position is not the open position.

18. An aircraft environmental control system, comprising:
an air supply duct adapted to receive a flow of conditioned air from a conditioned air source;
a first distribution duct coupled to the air supply duct to receive the flow of conditioned air therefrom;
a second distribution duct coupled to the air supply duct; and
a regulator valve mounted on the second distribution duct and moveable between an open position, in which the flow of conditioned air flows into and through the second distribution duct, and a closed position, in which the flow of conditioned air does not flow into and through the second distribution duct, the regulator valve comprising:
a valve body defining a flow passage;
a motor adapted to receive valve position command signals representative of a commanded valve position, the motor configured, in response to the valve position command signals, to rotate in a commanded direction;
a valve element disposed at least partially within the flow passage and moveable between the open position and the closed position, the valve element at least partially responsive to motor rotation to move to the commanded valve position; and
a pneumatic actuator coupled to the valve body and adapted to sense fluid pressure in the flow passage upstream of the valve element, the pneumatic actuator configured to supply an open drive force that moves the valve element to the open position solely when the sensed fluid pressure reaches a predetermined value, regardless of the commanded valve position.

19. The system of claim 18, wherein:
the pneumatic actuator is further configured to supply a close drive force that urges the valve element toward the closed position at least when (i) the valve element is not in the closed position and (ii) the sensed fluid pressure is below the predetermined value; and
the close drive force has a magnitude that is insufficient to move the valve element to the closed position when the commanded valve position is the open position.

20. The system of claim 18, further comprising:
a backlash coupling coupled to the motor and configured to rotate in response thereto; and
a bellcrank coupled between the pneumatic actuator and the valve element and configured to (i) move the valve element to the commanded position at least partially in response to rotation of the backlash coupling and (ii) move the valve element to the open position in response to the open drive force, regardless of the commanded valve position.

* * * * *